United States Patent
Jang et al.

(10) Patent No.: US 9,618,817 B2
(45) Date of Patent: Apr. 11, 2017

(54) ARRAY SUBSTRATE AND NARROW BEZEL-TYPE LIQUID CRYSTAL DISPLAY DEVICE INCLUDING THE SAME

(71) Applicant: LG DISPLAY CO., LTD., Seoul (KR)

(72) Inventors: Doo-Hee Jang, Paju-si (KR);
Jeong-Yun Lee, Seoul (KR); Hang-Sup Cho, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 79 days.

(21) Appl. No.: 13/689,454

(22) Filed: Nov. 29, 2012

(65) Prior Publication Data

US 2013/0148072 A1 Jun. 13, 2013

(30) Foreign Application Priority Data

Dec. 8, 2011 (KR) ........................ 10-2011-0131149

(51) Int. Cl.
| | | |
|---|---|---|
| *G02F 1/1362* | (2006.01) | |
| *G02F 1/1343* | (2006.01) | |
| *G02F 1/1345* | (2006.01) | |

(52) U.S. Cl.
CPC ...... *G02F 1/136286* (2013.01); *G02F 1/1345* (2013.01); *G02F 1/13439* (2013.01); *G02F 1/13452* (2013.01); *G02F 1/13458* (2013.01)

(58) Field of Classification Search
CPC .............. G02F 1/1345; G02F 1/13452; G02F 1/13458; G02F 1/136286
USPC .................................................. 349/149–152
See application file for complete search history.

(56) References Cited

U.S. PATENT DOCUMENTS

| | | | |
|---|---|---|---|
| 7,220,612 B2* | 5/2007 | Ahn et al. ........................ | 438/30 |
| 2005/0088830 A1* | 4/2005 | Yumoto et al. ............... | 349/150 |
| 2006/0139548 A1 | 6/2006 | Ahn | |
| 2006/0283833 A1* | 12/2006 | Lee et al. ...................... | 349/139 |
| 2007/0001170 A1* | 1/2007 | Jung .............................. | 257/59 |

FOREIGN PATENT DOCUMENTS

| | | |
|---|---|---|
| CN | 1348211 A | 5/2002 |
| CN | 1607432 A | 4/2005 |
| CN | 1664664 A | 9/2005 |
| CN | 1794076 A | 6/2006 |
| JP | 2006-30829 A | 2/2006 |

* cited by examiner

*Primary Examiner* — Dung Nguyen
(74) *Attorney, Agent, or Firm* — Birch, Stewart, Kolasch & Birch, LLP

(57) ABSTRACT

An LCD device includes a first substrate including a display region having pixel regions and a non-display region disposed outside the display region; gate lines and data lines on the first substrate and cross each other to define the pixel regions; a TFT in each of the pixel regions; a pixel electrode in each pixel region and connected to the TFT; a second substrate disposed opposite the first substrate; a color filter layer on the second substrate; a common electrode; a liquid crystal layer between the first and second substrates; and an FPC connected to the non-display region on one side of the first substrate, the FPC being bent toward an outer side surface of the second substrate, wherein each of the gate lines has a double structure including a first layer of a transparent conductive material and a second layer of Cu or Cu alloy.

17 Claims, 8 Drawing Sheets

ARRAY SUBSTRATE AND NARROW BEZEL-TYPE LIQUID CRYSTAL DISPLAY DEVICE INCLUDING THE SAME

The present application claims the priority benefit of Korean Patent Application No. 10-2011-0131149 filed in the Republic of Korea on Dec. 8, 2011, which is hereby incorporated by reference.

BACKGROUND

Field of the Disclosure

The present disclosure relates to a liquid crystal display (LCD) device, and more particularly, to a narrow bezel-type LCD capable of minimizing the width of a non-display region to embody borderless products.

Discussion of the Related Art

In general, a liquid crystal display (LCD) device may operate based on optical anisotropy of LCs.

Specifically, in the LCD device, when a voltage is applied, molecular arrangement of LCs may be changed according to the intensity of an electric field, and light may be controlled according to the molecular arrangement of the LCs to create images. The LCD device may include an upper substrate having a common electrode, a lower substrate having pixel electrodes, and an LC layer filled between the upper and lower substrates.

An LCD will now be described in further detail with reference to FIGS. 1 and 2.

FIG. 1 is a schematic plan view of the related art LCD device, and FIG. 2 is a schematic cross-sectional view of the related art LCD device.

Referring to FIGS. 1 and 2, a typical LCD 1 may include a color filter substrate 30 having a color filter layer 35, an array substrate 10 having thin film transistors (TFTs), gate lines (not shown), data lines (not shown), and pixel electrodes 15, and an LC layer 40 interposed between the color filter substrate 30 and the array substrate 10.

A plurality of gate pad electrodes (not shown) and a plurality of data pad electrodes (not shown) may be respectively formed on non-display regions NA1 and NA4 disposed on upper and left sides of the array substrate 10, and connected to an external driver circuit. Gate link lines (not shown) and data link lines (not shown) may be respectively formed on the upper and left sides of the array substrate 10, and connected to the plurality of gate pad electrodes and the plurality of data pad electrodes.

In addition, a plurality of gate lines (not shown) and a plurality of data lines (not shown) may be disposed across each other in a display region DA of the array substrate 10 to define a plurality of pixel regions (not shown). The plurality of gate lines may be respectively connected to the gate pad electrodes through the gate link lines, and extend in a widthwise direction. The data lines may be respectively connected to the data pad electrodes through the data link lines, and extend in a lengthwise direction.

Furthermore, the TFTs may be respectively formed near intersections between the gate and data lines, and a pixel electrode 15 may be formed in each of the pixel regions and connected to a drain electrode (not shown) of the corresponding TFT.

The color filter substrate 30 may be formed opposite the array substrate 10 having the above-described structure. The color filter layer 35 and black matrices (not shown) may be formed on the color filter substrate 30, and a common electrode may be formed on the entire surface of the color filter substrate 30. The color filter layer 35 may include red(R), green(G), and blue(B) color filter patterns (not shown) sequentially and repetitively provided to correspond to the respective pixel regions. The black matrices may be formed between the respective color patterns and surround the gate lines and data lines of the array substrate 10, and correspond to non-display regions NA1, NA2, NA3, and NA4 configured to surround an outer portion of the display region DA.

In addition, the LC layer 40 may be interposed between the array substrate 10 and the color filter substrate 30. A seal pattern 42 corresponding to edges of the two substrates 10 and 30 may be formed in the non-display regions NA1, NA2, NA3, and NA4 to form an LC panel 2.

A backlight unit (BLU) used as a light source may be provided on an outer side surface of the array substrate 10 of the LC panel 2 having the above-described construction. A driver (not shown) configured to drive the LC panel 2 may be disposed at an outer portion of the LC panel 2 to complete the LCD device 1.

In general, the driver may be embodied on a printed circuit board (PCB) 50, which may be divided into a gate PCB (not shown) connected to the gate lines of the LC panel 2, and a data PCB 50 connected to the data lines.

Furthermore, the PCB 50 may be mounted on the non-display regions NA1, NA2, NA3, and NA4 disposed outside the display region DA of the LC panel 2.

That is, the PCB 50 may be in contact with the data pad electrodes connected to the data lines through a tape carrier package (TCP) technique or a flexible printed circuit boards (FPCs) 61 and 62 in one side of the array substrate 10.

In this case, instead of the gate PCB, a plurality of gate FPCs 61 including driver IC chips 71 may be mounted on the fourth non-display region NA4 including the gate pad electrodes, and electrically connected to the data PCB 50 adhered to the first non-display region NA1 including the data pad electrodes via a plurality of data FPCs 62 in the array substrate 10.

The LCD device 1 having the above-described construction has briskly been applied to various electronic devices, such as televisions (TVs), monitors, laptop computers, cellular phones, and personal digital assistants (PDAs).

In the latest display devices, maximizing the size of the display region DA, and minimizing the sizes of the non-display devices NA1, NA2, NA3, and NA4 have been required.

However, as described above, in the conventional LCD device 1 in which the PCBs 50 are mounted on the fourth non-display device NA4 having the gate pad electrodes, and the first non-display region NA1 having the data pad electrodes by interposing the FPCs 61 and 62, the gate and data PCBs 50 may be mounted on at least two side surfaces of the LCD device 1 by interposing the FPCs 61 and 62. Alternatively, the data PCB 50 may be mounted on the first non-display region NA1 having the data pad electrodes by interposing the FPC 62 therebetween, while the driver IC chips 71 configured to process gate signals may be mounted on the fourth non-display region NA4 having the gate pad electrodes.

That is, the FPCs 61 and 62 to which the PCB 50 or the driver IC chips 71 are adhered may be mounted on the non-display regions NA1, NA2, NA3, and NA4 of the array substrate 10. After the FPCs 61 and 62 are mounted on the array substrate 10, the FPCs 61 and 62 may be bent and disposed on a rear surface of the array substrate 10 during modularization with a backlight unit BLU.

In the conventional LCD 1 having the above-described construction, the FPCs 61 and 62 may be bent along end tips of side surfaces of the array substrate 10. Finally, a width w1 of the non-display regions NA of the LCD device 1 may expand by as much as a thickness d1 of each of the FPCs 61 and 62 and a distance d2 between each of the FPCs 61 and 62 and the end of the side surface of the array substrate 10, so it is difficult to provide borderless products having narrow bezels.

SUMMARY OF THE INVENTION

Accordingly, the present invention is directed to a narrow bezel-type liquid crystal display (LCD) device that substantially obviates one or more of the problems due to limitations and disadvantages of the related art.

An object of the present disclosure is to provide a narrow bezel-type LCD device in which a bending direction of a flexible printed circuit board (FPC) to which a printed circuit board (PCB) or driver IC chips are adhered, may be changed to further reduce a non-display region of the LCD device so that the LCD device can have a further reduced width.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, an LCD device includes: a first substrate including a display region having a plurality of pixel regions and a non-display region disposed outside the display region; gate lines and data lines on the first substrate and cross each other to define the pixel regions; a thin-film transistor (TFT) formed in each of the pixel regions; a pixel electrode formed in each of the pixel regions and connected to the TFT; a second substrate disposed opposite the first substrate; a color filter layer formed on an inner side surface of the second substrate; a common electrode for generating an electric field with the pixel electrode; a liquid crystal layer between the first and second substrates; and a flexible printed circuit board (FPC) connected to the non-display region on one side of the first substrate, the FPC being bent toward an outer side surface of the second substrate, wherein each of the gate lines in contact with the first substrate has a double structure including a first layer formed of a transparent conductive material and a second layer formed of copper (Cu) or copper alloy.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 3:
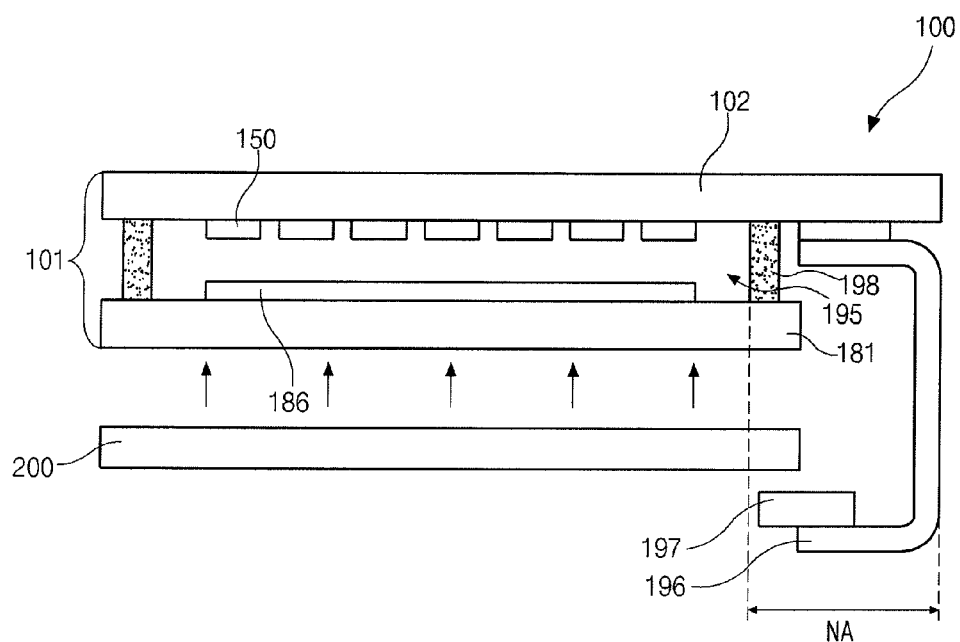
FIG. 3 is a schematic cross-sectional view of an LCD device according to an embodiment of the present invention.
Figure 4:
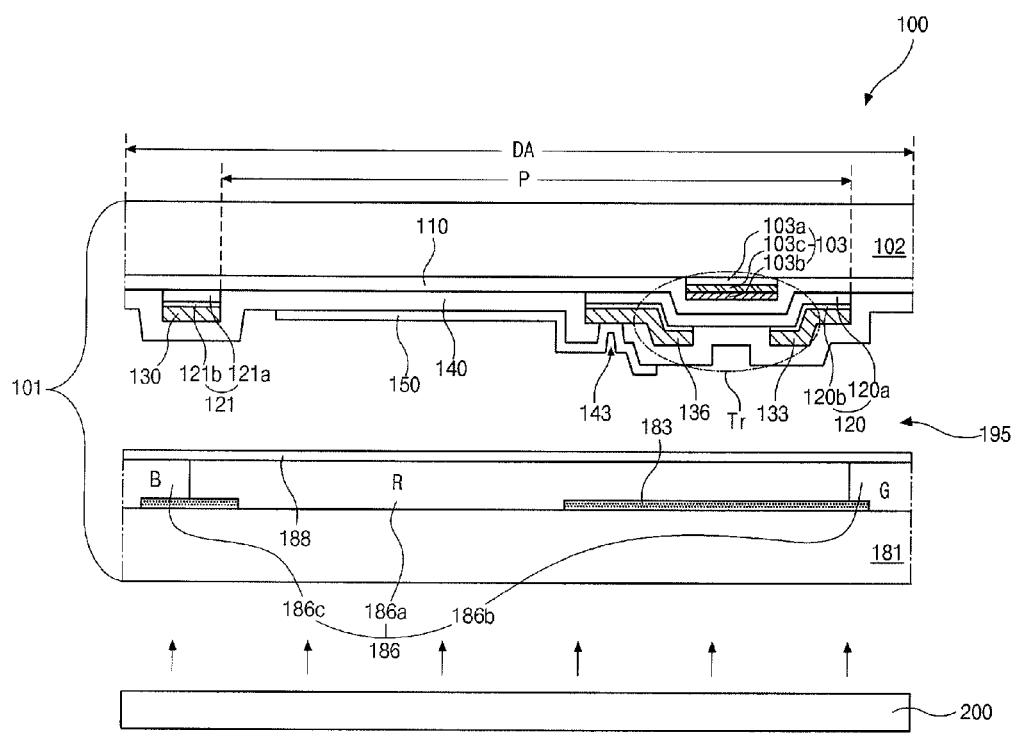
FIG. 4 is a cross-sectional view of one pixel region of an LCD device according to an embodiment of the present invention.
Figure 5:
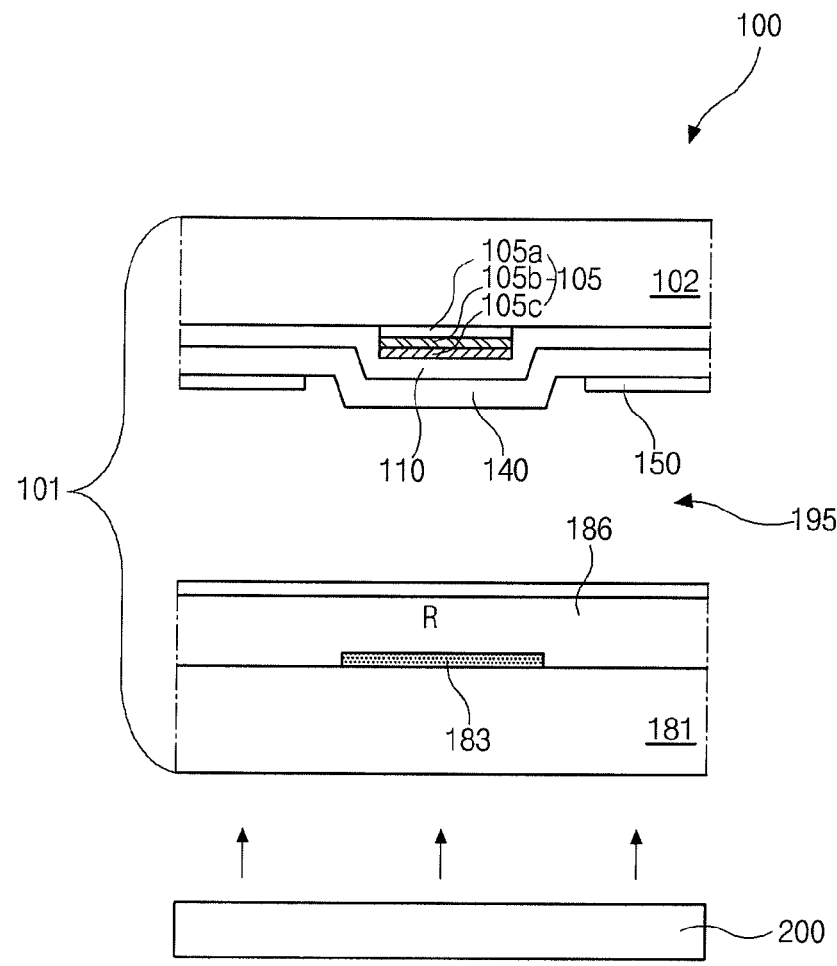
FIG. 5 is a cross-sectional view of a portion of an LCD device in which gate lines are formed, according to an embodiment of the present invention.

FIG. 3 is a schematic cross-sectional view of a liquid crystal display (LCD) device according to an embodiment of the present invention, FIG. 4 is a cross-sectional view of one pixel region of an LCD device according to an embodiment of the present invention, and FIG. 5 is a cross-sectional view of a portion of an LCD device in which gate lines are formed, according to an embodiment of the present invention.

Referring to FIGS. 3 through 5, an LCD device 100 according to an embodiment of the present invention may include a liquid crystal panel 101 and a flexible printed circuit board (FPC) 196. The liquid crystal panel 101 may include an array substrate, a color filter substrate and a liquid crystal layer 195 therebetween. The array substrate may include a first substrate 102, a gate line 103, a data line 130, a thin film transistor (TFT) Tr and a pixel electrode 150. The gate and data lines 103 and 130 cross each other to define a pixel region P. The TFT Tr is disposed in each pixel region P. The pixel electrode 150 is connected to the TFT Tr. The color filter substrate may include a second substrate 181 and a color filter layer 186. The FPC 196, which is connected to a non-display region NA of the array substrate, is bent toward a rear side of the color filter substrate. A printed circuit board (PCB) 197 may be mounted on the FPC 196.

In this case, a backlight unit (BLU) 200 may be further provided on a rear surface of the color filter substrate 181.

One feature of the LCD device 100 according to the embodiment of the present invention is that the array substrate is disposed at an upper side viewed by a user, the color filter substrate is disposed at a lower side viewed by the user, and the BLU 200 is disposed on the rear surface of the color filter substrate. Furthermore, another feature of the LCD device 100 according to the embodiment of the present invention is that the FPC 196 mounted on the non-display region NA of the array substrate is bent toward the rear surface of the color filter substrate on which the BLU 200 is provided so that the width of the non-display region NA can be reduced more than in the conventional LCD device (refer to 1 in FIG. 2).

Figure 1:
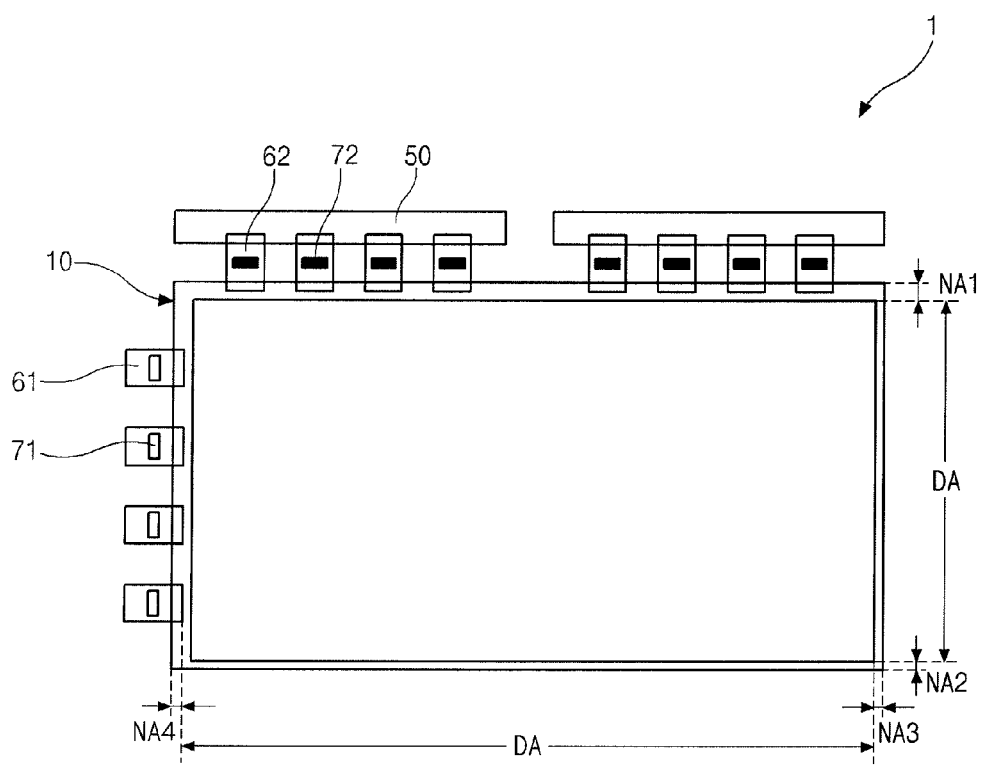
FIG. 1 is a schematic plan view of the related art liquid crystal display (LCD) device.
Figure 2:
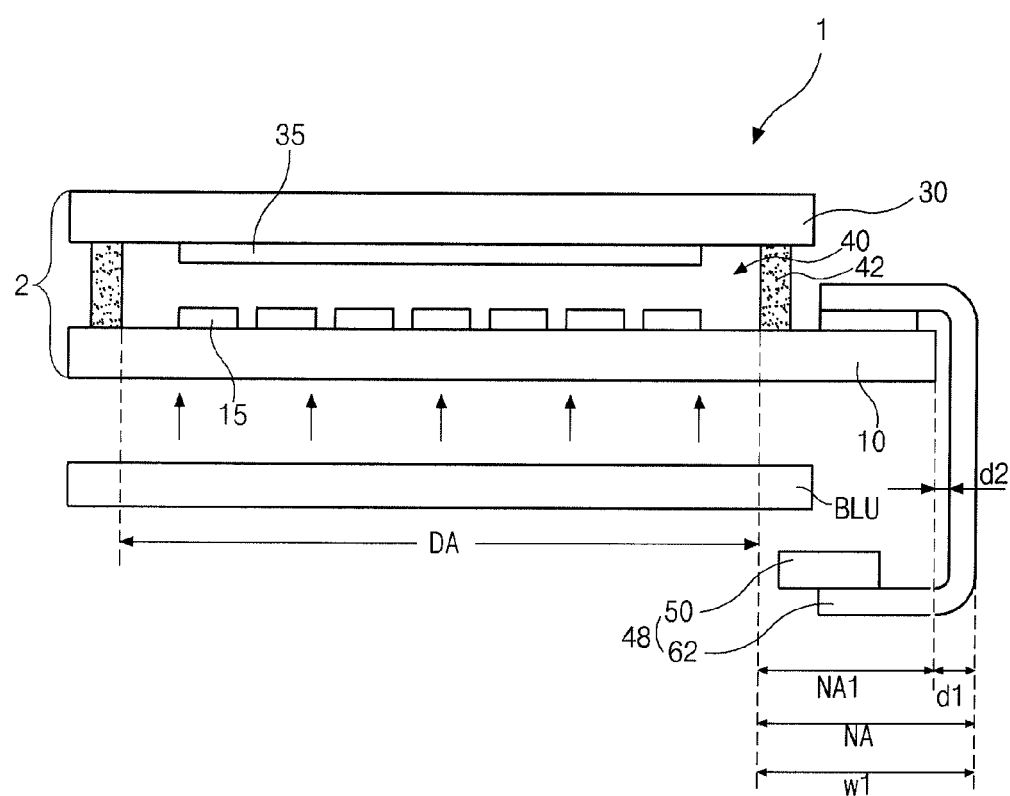
FIG. 2 is a schematic cross-sectional view of the related art LCD device.

That is, in the conventional LCD device (refer to 1 in FIG. 2), the array substrate (refer to 10 in FIG. 2) may be disposed at a lower side, the color filter substrate (refer to 30 in FIG. 2) may be disposed at an upper side, and the BLU (refer to FIG. 2) may be disposed on an outer side surface of the array substrate (refer to 10 in FIG. 2). Thus, after the FPC (refer to 62 in FIG. 2) is mounted on the display region (refer to DA in FIG. 2) of the array substrate (refer to 10 in FIG. 2), the FPC 62 may cover the end tips of the side surfaces of the array substrate 10, and be bent and disposed on the rear surface of the BLU 200. Thus, the width of the non-display region NA may substantially become the sum of the width of the non-display region (refer to NA1 in FIG. 2) of the array substrate 10, the thickness d1 of the bent FPC 62, and the distance d1 between the FPC 62 and the end tip of the side surface of the array substrate 10.

By comparison, in the LCD device 100 according to the embodiment of the present invention, the array substrate may be disposed at the upper side viewed by the user. Thus, after the FPC 196 is adhered to the non-display region NA of the array substrate, the FPC 196 may not be bent to cover side surfaces of the array substrate, but be bent toward the rear surface of the color filter substrate.

Accordingly, in the LCD device 100 according to the present invention, the FPC 196 may not cover a side surface of the array substrate, but be bent toward an outer side surface of the color filter substrate such that a bending unit is disposed inside an outermost side surface of the non-display region NA of the array substrate. Thus, as compared with the conventional LCD device (refer to 1 in FIG. 2), the width of the non-display region NA may be reduced by as much as at least the thickness of the FPC 196 and the distance between the FPC 196 and the side surface of the array substrate, so that a narrow bezel having a much smaller width can be embodied.

Internal components of the LC panel 101 of the LCD device 100 having the external construction, according to the embodiment of the present invention, will now be described. Here, inner side surfaces of the array substrate and the color filter substrate disposed opposite each other are defined as respective reference positions for brevity. Thus, when components sequentially stacked on the array substrate and the color filter substrate are formed at a higher level than the inner surfaces of the array substrate and the color filter substrate, it is assumed that the components are disposed on or over the array substrate and the color filter substrate.

As shown in FIGS. 3 through 5, the LC panel 101 for the LCD device 100 according to the present invention may include the array substrate, the color filter substrate, and the LC layer 195 interposed between the array substrate and the color filter substrate.

To begin, construction of the array substrate disposed at an upper side will now be described. The array substrate may include a plurality of gate lines 103 and a plurality of data lines 130 formed on an inner side surface of the first substrate 102 formed of a transparent insulating base material, for example, glass or plastic. The gate lines 103 and the data lines 130 may be respectively formed under and on a gate insulating layer 110 and extend lengthwise and crosswise, and cross each other to define a plurality of pixel regions P.

Although not shown in the drawings, common lines (not shown) may be further formed on the inner side surface of the first substrate 102 according to a mode of the LCD device 100. The common lines may be formed of the same material as the gate lines 103, and penetrate each of the pixel regions P apart from the gate lines 103.

Gate pad electrodes (not shown) and data pad electrodes (not shown) may be formed on the non-display region NA disposed outside the display region DA. The gate pad electrodes may be respectively connected to one end of the gate lines 103, and the data pad electrodes may be respectively formed on one end of the data lines 130. When the common lines are formed, a subsidiary common line (not shown) configured to connect all ends of each of the common lines and a common pad electrode (not shown) connected to one end of the subsidiary common line, may be formed.

Another feature of the LCD device 100 according to the embodiment of the present invention is that the gate lines 103 and gate electrodes 105 (and the common lines) formed in direct contact with the first substrate 102 respectively have triple structures including first layers 103a and 105a formed of a transparent conductive material, third layers 103c and 105c formed of a first metal material, and second layers 103b and 105b formed of copper (Cu) or a copper alloy having low-resistance characteristics. Alternatively, as shown in FIG. 6 that is a cross-sectional view of a portion of an LCD device in which gate lines are formed, according to a first modified example of the embodiment of the present invention, the gate lines 103 and the gate electrodes 105 (and the common lines) may be formed in contact with the first substrate 102 and respectively have double structures including first layers 103a and 105a formed of a transparent conductive material, and second layers 103b and 105b formed of copper or a copper alloy having low-resistance characteristics.

Figure 6:
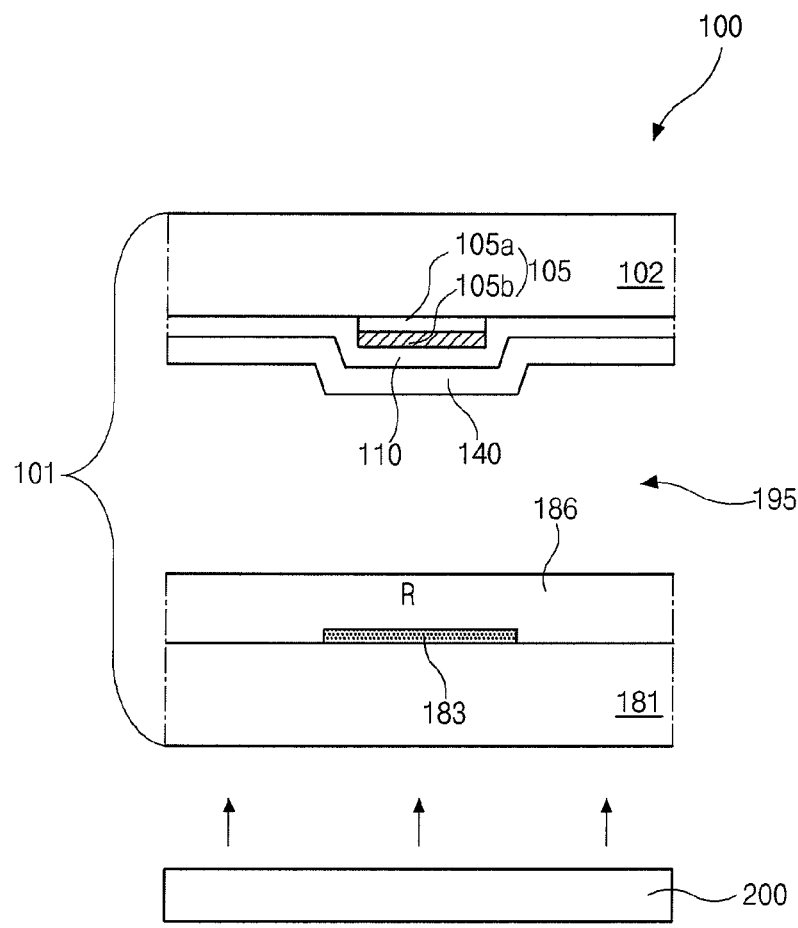
FIG. 6 is a cross-sectional view of a portion of an LCD device in which gate lines are formed, according to a first modified example of the embodiment of the present invention.

Referring to FIGS. 4, 5, and 6, the transparent conductive material forming the first layers 103a and 105a may be, for example, indium tin oxide (ITO) or indium zinc oxide (IZO), and the first metal material may be molybdenum (Mo) or molybdenum titanium (MoTi).

By forming the gate lines 103 and the gate electrodes 105 (and the common lines) to have the double structures (refer to FIG. 6) or the triple structures (refer to FIGS. 4 and 5) as described above, reflectance of external light may be reduced, and copper may be used as materials for lines and electrodes to cope with scaling-up.

More specifically, when the second layers 103b and 105b are formed of copper in the embodiment and the modified example thereof, the LCD device 100 may be applied to large-area TVs in excess of 30-square inches in area. Since a 30-inch or larger LCD 100 has longer lines, problems, such as signal delays, may occur.

Accordingly, to minimize the problems, such as signal delays, lines and electrodes may be formed of a metal having a relatively low resistance per unit area. Copper or copper alloys may have lower resistances per unit area, and be cheaper than aluminum (Al) and aluminum alloys.

However, since the copper and copper alloys are less adhesive to the first substrate 102 formed of glass or a plastic material than aluminum and aluminum alloys, when only the copper or copper alloy is deposited on the first substrate 102 and patterned into lines, the copper or copper alloy may be separated from the first substrate 102 and lost during the patterning process.

Accordingly, to prevent the loss of the copper or copper alloy, the third layers 103c and 105c may be formed as under layers using Mo or MoTi having good adhesion not only to the copper or copper alloy or a substrate formed of glass, or the first layers 103a and 105a may be formed as under layers using ITO or IZO as a transparent conductive material.

In the embodiment in which the gate lines 103 and the gate electrodes 105 (and the common lines (not shown)) have triple structures, the first layers 103a and 105a formed of a transparent conductive material may be provided between the third layers 103c and 105c and the first substrate 102 to reduce reflectance of external light.

Since the array substrate 102 is disposed at the upper side viewed by the user due to the feature of the present invention, the gate lines 103 and the gate electrodes 105 (and the common lines) may become components disposed at substantially the highest layer based on the surface of the array substrate 102 viewed by the user. In particular, since Mo or MoTi has a high reflectance of about 68% with respect to external light, an ambient contrast ratio may be reduced.

Accordingly, to reduce reflectance of external light, the first layers 103a and 105a formed of a transparent conductive material (i.e., ITO or IZO) may be provided between the first substrate 102 and the third layers 103c and 105c formed of Mo or MoTi in the triple structures, or provided between the first substrate 102 and the second layers 103b and 105b formed of copper or a copper alloy.

Thus, when the first layers 103a and 105a formed of ITO or IZO are provided between the third layers 103c and 105c formed of Mo or MoTi and the first substrate 102, or between the second layers 103b and 105b formed of copper or a copper alloy and the first substrate 102, reflectance of external light may be reduced to about 39% or less.

In the embodiment in which the gate lines 103 and the gate electrodes 105 (and the common lines) have the triple structures, each of the third layers 103c and 105c formed of Mo or MoTi may have a thickness of about 50 Å to about 500 Å, and each of the first layers 103a and 105a formed of indium tin oxide (ITO) or indium zinc oxide (IZO) as a transparent conductive material may have a thickness of about 200 Å to about 600 Å. Each of the first layers 103a and 105a formed of the transparent conductive material may be formed to a greater thickness than each of the third layers 103c and 105c formed of Mo or MoTi.

When material layers having double (or triple) structures are formed using at least two materials to specific thicknesses, the material layers may have different refractive indices. Thus, light reflected by the surfaces of the respective material layers may cause destructive interference due to differences in the refractive index and thickness. This phenomenon may be referred to as an anti-reflection coating effect. Due to the anti-reflection coating effect, the intensity of light reflected may be finally reduced.

Meanwhile, the TFTs Tr including the gate electrodes 105 connected to the gate lines 103 having the above-described double or triple structures may be formed near the intersections between the gate lines 103 and the data lines 130 in the respective pixel regions P. The TFTs Tr serving as switching devices may be formed by stacking the gate insulating layer 110, a semiconductor layer 120, and source and drain electrodes 133 and 136 on the gate electrodes 105. In this case, the semiconductor layer 120 may include an active layer 120a formed of amorphous silicon (a-Si), and an ohmic contact layer 120b formed of doped a-Si, and the ohmic contact layer 120b may be formed over and apart from the active layer 120a. Also, the source and drain electrodes 133 and 136 may be spaced apart from each other. The source electrode 133 may be connected to the data line 130.

Although it is illustrated that semiconductor dummy patterns 121 having double structures including first and second patterns 121a and 121b are formed of the same material as the semiconductor layer 120 between the data lines 130 and the gate insulating layer 110, since the semiconductor dummy patterns 121 provided under the data lines 130 are formed due to fabrication process characteristics, the semiconductor dummy patterns 121 may be omitted.

Furthermore, a first protection layer 140 may be provided on the TFTs Tr over the entire surface of the first substrate 102. The first protection layer 140 may be formed of an inorganic insulating material, such as silicon oxide ($SiO_2$) or silicon nitride ($SiN_x$), or an organic insulating material, such as photoacryl or benzocyclobutene (BCB).

In this case, drain contact holes 143 may be provided in the first protection layer 140 to expose the drain electrodes 136 of the respective TFTs Tr. Also, gate pad contact holes (not shown) and data pad contact holes (not shown) may be provided in the first protection layer 140 to expose the respective gate pad electrodes and the respective data pad electrodes.

In addition, when the common lines and the subsidiary common line are formed, common contact holes (not shown) exposing the common lines and a common pad contact hole (not shown) exposing the common pad electrode connected to the subsidiary common line may be provided in each of the pixel regions P. When the common lines are used as storage electrodes, the common contact holes may be omitted.

Meanwhile, plate-type pixel electrodes 150 may be formed on the first protection layer 140 to respectively correspond to the pixel regions P. The plate-type pixel electrodes 150 may be respectively in contact with the drain electrodes 136 through the drain contact holes 143. Subsidiary gate pad electrodes (not shown) and subsidiary data pad electrodes (not shown) may be formed in the non-display region NA. The subsidiary gate pad electrodes may be in contact with the gate pad electrodes through the gate pad contact holes, while the subsidiary data pad electrodes may be in contact with the data pad electrodes through the data pad contact holes.

In addition, when the subsidiary common line is formed, a subsidiary common pad electrode (not shown) may be formed on the first protection layer 140 and in contact with the common pad electrode through the common pad contact hole.

Meanwhile, the array substrate having the above-described construction may be an array substrate for a twisted nematic (TN)-mode LCD device because only the pixel electrode 150 is provided in each of the pixel electrodes P. However, the array substrate may be variously modified when applied to an in-plane switching-mode LCD device, or a fringe-field switching (FFS)-mode LCD device.

Figure 7:
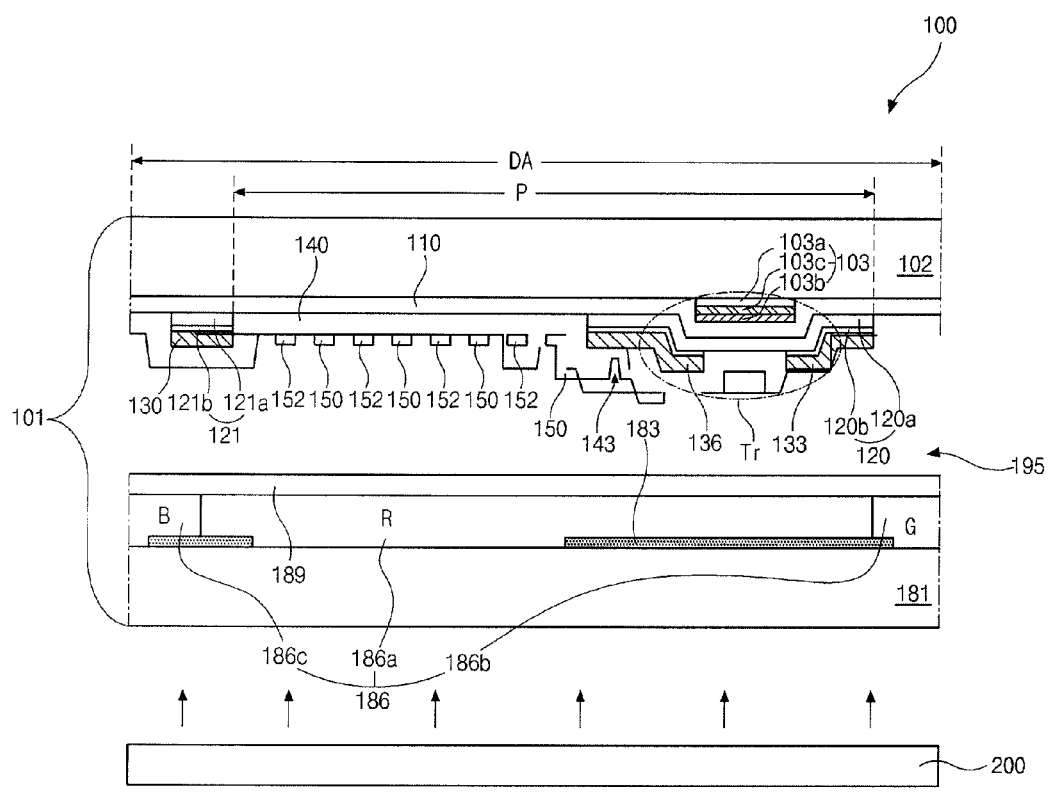
FIG. 7 is a cross-sectional view of one pixel region of an LCD device according to a second modified example of the embodiment of the present invention.

In an example in which the array substrate is an array substrate for an in-plane switching-mode LCD device, referring to FIG. 7 that is a cross-sectional view of one pixel region of an LCD device according to a second modified example of the embodiment of the present invention, a plurality of bar-shaped pixel electrodes 150 may be formed a predetermined distance apart from one another in the respective pixel regions P instead of the plate-type pixel electrodes. Also, a plurality of bar-shaped common electrodes 152 for generating an electric field with the pixel electrode 150, may be formed a predetermined distance apart from and parallel to the plurality of bar-shaped pixel electrodes 150. The plurality of bar-shaped common electrodes 152 may alternate with the plurality of bar-shaped pixel electrodes 150. In this case, the plurality of bar-shaped common electrodes 152 may be in contact with the common lines through the common contact holes.

Although not shown in the drawings, the bar-shaped common electrodes 152 and the bar-shaped pixel electrodes 150 may form symmetrically curved shapes on the basis of central portions of the respective pixel regions P so that each of the pixel regions P has a double domain region with upper and lower portions. When each of the pixel regions P is formed to have the double domain region, chrominance relative to a variation in viewing angle at which a user sees the display region DA may be suppressed to improve display quality.

Figure 8:
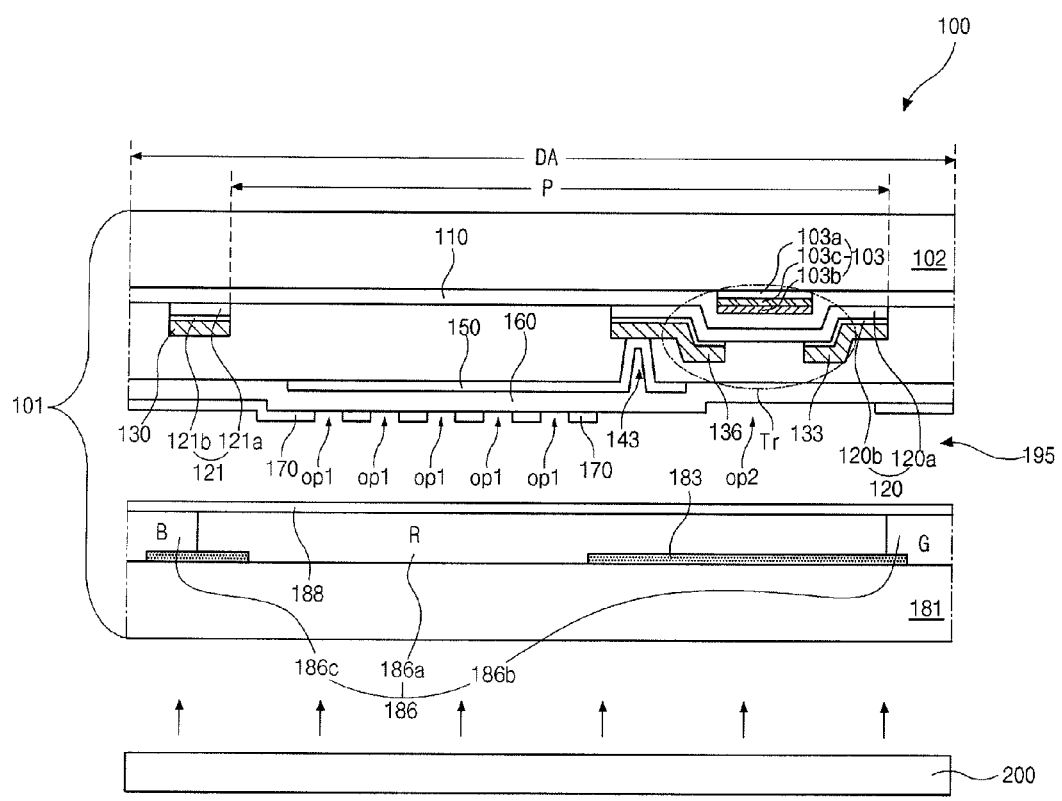
FIG. 8 is a cross-sectional view of one pixel region of an LCD device according to a third modified example of the embodiment of the present invention.

In another example in which the array substrate 102 is an array substrate for an FFS-mode LCD device, referring to FIG. 8 that is a cross-sectional view of one pixel region of an LCD device according to a third modified example of the embodiment of the present invention, a second protection layer 160 may be provided on the plate shape pixel electrodes 150, and a plurality of bar-shaped common electrodes 170 having first openings opt may be formed on the second protection layer 160. The bar-shaped common electrodes 170 may respectively correspond to the plate-type pixel electrodes 150 and be a predetermined distance apart from one another. In this case, the common electrodes 170 may be formed over the entire surface of the display region DA. In this case, the common electrodes 170 may further include second openings op2 corresponding to the TFTs Tr.

Similarly, in the array substrate 102 for the FFS-mode LCD device, the plurality of first openings op1 may form symmetrically curved shapes on the basis of central portions of the respective pixel regions P so that each of the pixel regions P has a double domain region.

Meanwhile, in the array substrate 102 for the FFS-mode LCD device having the above-described construction, the positions of the pixel electrodes 150 and the common electrodes 170 may be exchanged. Thus, the pixel electrodes 150 may be formed over the common electrodes 170. In this case, the plurality of first openings op1 may be formed in the pixel electrodes 150.

Referring to FIGS. 4 through 8, black matrices 183 may be provided on the color filter substrate 181 disposed to correspond to the array substrate 102 having the above-described various constructions. The black matrices may be formed on the inner side surface of a second substrate 181 formed of transparent glass or plastic, and correspond to boundaries between the respective pixel regions P and the TFTs Tr. Also, the color filter layer 186 may be formed by sequentially repeating red(R), green(G), and blue(B) color filter patterns 186a, 186b, and 186c corresponding to the respective pixel regions P surrounded with the black matrices 183.

When the array substrate 102 is a TN-mode array substrate as shown in FIG. 4, a common electrode 188 formed of a transparent conductive material may be provided on the entire surface of the display region DA to cover the color filter layer 186. When the array substrate 102 is an array substrate for an in-plane switching-mode or FFS-mode LCD device as shown in FIGS. 7 and 8, an overcoat layer 189 having a planar surface may be formed to cover the color filter layer 186.

Referring to FIGS. 3 through 8, the LC layer 195 may be provided between the array substrate 102 and the color filter substrate 181 having the above-described constructions. Also, the LC panel 101 may further include a seal pattern 198 configured to surround the display region DA to prevent leakage of LCs from the LC layer 195. The seal pattern 198 may combine and adhere the array substrate 102 and the color filter substrate 181 with and to each other.

Although not shown, a plurality of pillar-type patterned spacers (not shown) may be provided at the boundaries between the pixel regions P, and spaced a predetermined distance apart from one another so that the LC layer 195 interposed between the array substrate 102 and the color filter substrate 181 can maintain a constant thickness over the entire surface of the display region DA.

In addition, a BLU 200 may be provided on the rear surface of the color filter substrate 181 of the LC panel 101 having the above-described construction, and the PCB 197 or the FPC 196 having the driver IC chips (not shown) may be adhered to the rear surface of the color filter substrate 181 in contact with the subsidiary gate and data pad electrodes provided in the non-display region NA of the array substrate 102. The FPC 196 on which the PCB 197 or the driver IC chips are mounted, may not be exposed outside a side end of the array substrate 102, but be bent to constitute the LCD device 100 according to the embodiment of the present invention.

In the LCD device 100 having the above-described construction, according to the embodiment of the embodiment of the present invention, the array substrate 102 may be disposed at an upper side viewed by a user, the color filter substrate 181 may be disposed at a lower side viewed by the user, and the FPC 196 to which the PCB 197 or the drive IC chips are adhered, may be mounted on the non-display region NA of the array substrate 102. Thereafter, the FPC 196 may not be bent to cover the side surface of the array substrate 102, but be bent toward the rear surface of the color filter substrate 181, more specifically, the rear surface of the BLU 200 disposed on the rear surface of the color filter substrate 181, so that the width of the non-display region NA can be reduced more than in the conventional LCD (refer to 1 in FIG. 2) to provide borderless products having a narrower bezel.

In addition, the LCD device 100 according to the present invention may embody borderless products using narrow bezels and improve users' degrees of immersion in screens.

Furthermore, in the LCD device 100 according to the present invention, even if the array substrate 102 is disposed at an upper side viewed by a user, reflectance due to the gate lines 103 and the gate electrodes 105 may be reduced so that an ambient contrast ratio can be improved, thereby finally improving display quality.

In an LCD device according to the present invention, an array substrate may be disposed at an upper side viewed by a user, a color filter substrate may be disposed at a lower side viewed by the user, an FPC to which a PCB or driver IC chips are adhered, may be mounted on a non-display region of the array substrate and bent toward a rear surface of the color filter substrate not to cover a side surface of the array substrate. Thus, the width of the non-display region may be reduced more than in a conventional LCD device to provide narrow bezel-type borderless products.

In addition, the LCD device according to the present invention can embody narrow bezel-type borderless products and improve users' degrees of immersion in screens.

Furthermore, in the LCD device according to the present invention, even if the array substrate is disposed at an upper side viewed by a user, reflectance due to gate lines 103 and gate electrodes can be reduced so that an ambient contrast ratio can be improved, thereby finally improving display quality.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents.

What is claimed is:

1. A liquid crystal display (LCD) device comprising:
a first substrate on which a display region having a plurality of pixel regions and a non-display region are defined, the non-display region disposed outside the display region;
gate lines and data lines disposed on lower surfaces of the first substrate and a gate insulation layer, respectively, the gate lines and data lines crossing each other to define the pixel regions;
the gate insulation layer below the first substrate, the gate insulation layer being on a lower surface of the gate lines and above the data lines;
a thin-film transistor (TFT) in each of the pixel regions;
a pixel electrode in each of the pixel regions and connected to the TFT;
a second substrate disposed opposite the first substrate;
a color filter layer on an inner side surface of the second substrate;
a common electrode configured to generate an electric field with the pixel electrode;
a liquid crystal layer between the first and second substrates; and
a flexible printed circuit board (FPC) connected to the non-display region on one side of the first substrate, the FPC being bent toward an outer side surface of the second substrate,
wherein each of the gate lines in contact with the first substrate has a triple structure including:
a first layer of a transparent conductive material directly disposed under the first substrate;
a second layer of molybdenum (Mo) or a molybdenum alloy; and
a third layer of copper (Cu) or copper alloy,
wherein the first layer of the transparent conductive material is disposed between the first substrate and the second layer or disposed between the first substrate and the third layer to reduce reflectance of external light, and
wherein the first layer has a thickness of about 200 Å to about 600 Å, and the third layer has a thickness of about 50 Å to about 500 Å.

2. The device of claim 1, further comprising a printed circuit board (PCB) or a driver integrated circuit (IC) chip attached to the FPC.

3. The device of claim 1, further comprising a backlight unit (BLU) provided on an outer side surface of the second substrate, wherein the FPC is bent to overlap an outer side surface of the BLU.

4. The device of claim 1, wherein a gate electrode of the TFT is connected to the gate line and formed of the same material and at the same layer as the gate line.

5. The device of claim 1, wherein the common electrode is formed on the second substrate to cover the color filter layer.

6. The device of claim 1, further comprising a first protection layer on the entire surface of the display region of the first substrate to cover the TFT, wherein the first protection layer has a drain contact hole exposing a drain electrode of the TFT, and the pixel electrode is disposed on the first protection layer.

7. The device of claim 6, wherein the common electrode is disposed on the first substrate, and each of the pixel electrode and common electrode has a bar shape respectively formed in the pixel region, and wherein the common electrode is disposed on the first protection layer and alternately arranged with the pixel electrode.

8. The device of claim 7, further comprising a common line formed on the first substrate and extending to be parallel to the gate line, the common line formed of the same material and at the same layer as the gate line, wherein the common electrode is connected to the common line.

9. The device of claim 1, further comprising an insulating layer between the pixel and common electrodes, wherein one of the pixel and common electrodes has a plate shape, and the other one of the pixel and common electrode has an opening.

10. The device of claim 1, wherein all portions of the FPC are positioned inside the non-display region in plan view.

11. The device of claim 1, wherein the second substrate is a color filter substrate, and
wherein the common electrode and the color filter layer are between the TFT and the color filter substrate.

12. The device of claim 11, wherein a whole surface of the common electrode covers a whole surface of the color filter layer.

13. The device of claim 1, wherein the second substrate is a color filter substrate, and
wherein the color filter layer is between the TFT and the color filter substrate.

14. The device of claim 6, further comprising a second protection layer on the pixel electrode, wherein the common electrode has at least one opening and is disposed on the second protection layer.

15. An array substrate, comprising:
a gate line disposed on a lower surface of a substrate;
a data line disposed on a lower surface of a gate insulation layer and crossing the gate line to define a pixel region;
the gate insulation layer below the substrate, the gate insulation layer being on a lower surface of the gate line and above the data line;
a thin-film transistor (TFT) in the pixel region; and
a pixel electrode in the pixel region and connected to the TFT, wherein the gate line in contact with the substrate has a triple structure including:
a first layer of a transparent conductive material directly disposed under the substrate;
a second layer of molybdenum (Mo) or a molybdenum alloy; and
a third layer of copper (Cu) or copper alloy disposed above the gate insulation layer,
wherein the first layer of the transparent conductive material is disposed between the substrate and the second layer or disposed between the substrate and the third layer to reduce reflectance of external light,
wherein a thickness of the molybdenum (Mo) or the molybdenum alloy is smaller than that of the first layer of a transparent conductive material, and
wherein the first layer has a thickness of about 200 Å to about 600 Å, and the third layer has a thickness of about 50 Å to about 500 Å.

16. The array substrate of claim 15, further comprising:
a protection layer over the substrate to cover the TFT, wherein the protection layer has a drain contact hole exposing a drain electrode of the TFT, and the pixel electrode is disposed on the protection layer.

17. The array substrate of claim 15, further comprising a common electrode configured to generate an electric field with the pixel electrode, wherein the common electrode is disposed on the protection layer and alternately arranged with the pixel electrode.

* * * * *